United States Patent
Lee et al.

(10) Patent No.: US 10,120,761 B2
(45) Date of Patent: Nov. 6, 2018

(54) EXPANDER DEVICE AND METHOD FOR DATA COMMUNICATION WITHIN INTER-INTEGRATED (I²C) SYSTEM

(71) Applicant: MITAC COMPUTING TECHNOLOGY CORPORATION, Taoyuan (TW)

(72) Inventors: Jen-Chih Lee, Taoyuan (TW); Kwang-Chao Chen, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 161 days.

(21) Appl. No.: 15/293,402

(22) Filed: Oct. 14, 2016

(65) Prior Publication Data

US 2017/0123930 A1 May 4, 2017

(30) Foreign Application Priority Data

Oct. 30, 2015 (TW) ............................... 104135808 A

(51) Int. Cl.
*G06F 11/00* (2006.01)
*G06F 11/14* (2006.01)
(Continued)

(52) U.S. Cl.
CPC ...... *G06F 11/1441* (2013.01); *G06F 11/3027* (2013.01); *G06F 11/3051* (2013.01);
(Continued)

(58) Field of Classification Search
CPC ............... H04L 1/0061; G06F 11/0754; G06F 11/1441; G06F 11/3027; G06F 11/3051; G06F 13/4282
See application file for complete search history.

(56) References Cited

U.S. PATENT DOCUMENTS 6,728,908 B1 * 4/2004 Fukuhara .............. H04L 1/0061
714/43
2005/0060472 A1 * 3/2005 Mantey ............... G06F 13/4282
710/305
(Continued)

OTHER PUBLICATIONS

Search Report of TW Patent Application No. 104135808 (including an English translation).

*Primary Examiner* — Michael Maskulinski
(74) *Attorney, Agent, or Firm* — Brinks Gilson & Lione

(57) ABSTRACT

A method for data communication within an I²C system is provided. The method includes the steps of: a) generating a communication error code indicative of error status when data transmission from a master module to a slave module via an I²C bus fails; b) determining whether to retransmit the data to the slave module according to the communication error code; c) when the determination made in step c) is affirmative, determining whether a number of times of data retransmission(s) associated with the data reaches a predetermined number; d) when the determination made in step c) is affirmative, resetting the master module; and e) recording a communication error event according to the communication error code after step a).

17 Claims, 2 Drawing Sheets

(51) Int. Cl.
*G06F 13/42* (2006.01)
*G06F 11/30* (2006.01)
*G06F 13/364* (2006.01)
*G06F 13/24* (2006.01)

(52) U.S. Cl.
CPC ............ *G06F 13/24* (2013.01); *G06F 13/364* (2013.01); *G06F 13/4282* (2013.01)

(56) References Cited

U.S. PATENT DOCUMENTS

2007/0234136 A1* 10/2007 Leef ...................... H04L 1/0061
714/704
2007/0240019 A1* 10/2007 Brady ................. G06F 13/4291
714/43
2009/0006889 A1* 1/2009 Holdaway ........... G06F 11/0745
714/5.11
2009/0190480 A1 7/2009 Sammour et al.

\* cited by examiner

EXPANDER DEVICE AND METHOD FOR DATA COMMUNICATION WITHIN INTER-INTEGRATED ($I^2C$) SYSTEM

CROSS-REFERENCE TO RELATED APPLICATION

This application claims priority of Taiwanese Application No. 104135808, filed on Oct. 30, 2015.

FIELD

The disclosure relates to a method for data communication, more particularly to a method for data communication within an inter-integrated ($I^2C$) system, and an expander device.

BACKGROUND

A conventional inter-integrated circuit ($I^2C$) system usually includes a master module such as a micro-controller, an $I^2C$ bus, and a plurality of slave modules (for example, memories, hard drives, thermal sensors, etc.). The master module transmits data to and reads data from the slave modules via the $I^2C$ bus so as to monitor and manage status of the slave modules.

However, the conventional $I^2C$ communication system is relatively complicated, and undesirable communication error may occur during data transmission between the master module and the slave modules due to interference with the $I^2C$ bus.

SUMMARY

Therefore, an object of the present disclosure is to provide a method for data communication within an inter-integrated circuit ($I^2C$) system that includes a master module, an $I^2C$ bus and a slave module.

According to one aspect of the present disclosure, the method includes the steps of:
a) transmitting, by the master module, data to the slave module via the $I^2C$ bus;
b) generating, by the master module, a communication error code indicative of error status when data transmission from the master module to the slave module in step a) fails;
c) determining, by the master module, whether to retransmit the data to the slave module according to the communication error code generated in step b);
d) when the determination made in step c) is affirmative, determining, by the master module, whether a number of time(s) of data retransmission associated with the data from the master module to the slave module reaches a predetermined number;
e) when the determination made in step d) is affirmative, resetting the master module; and
f) after step b), recording, by the master module, a communication error event according to the communication error code.

According to another aspect of this disclosure, there is provided an expander device configured to be electrically connected to a slave module. The expander device includes:
an inter-integrated ($I^2C$) bus; and
a master module configured to
transmit data to the slave module via the $I^2C$ bus,
generate a communication error code indicative of error status when data transmission from the master module to the slave module fails,
determine whether to retransmit the data to the slave module according to the communication error code, and
record a communication error event according to the communication error code.

When data transmission from the master module to the slave module fails, the master module is configured to determine whether a number of time(s) of data retransmission from the master module to the slave module reaches a predetermined number.

The master module is reset when the number of time(s) of the data retransmission reaches the predetermined number.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
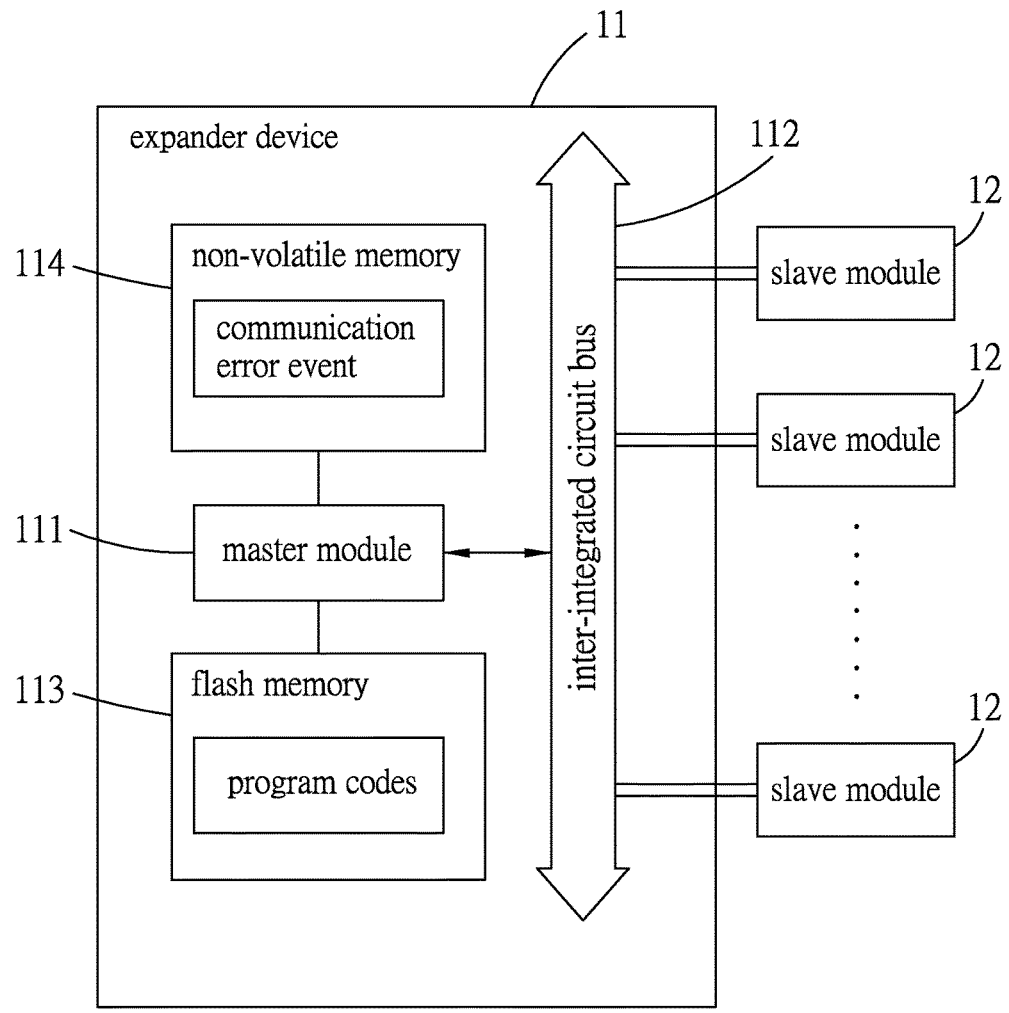
FIG. 1 is a block diagram illustrating an inter-integrated circuit ($I^2C$) system for implementing a method for data communication according to an embodiment of the present disclosure.

Referring to FIG. 1, an inter-integrated circuit ($I^2C$) system 1 according to an embodiment of this disclosure includes an expander device 11 and a plurality of slave modules 12. The expander device 11 includes a master module 111, an $I^2C$ bus 112, a flash memory 113 (e.g., a flash read-only memory), and a non-volatile memory 114. The master module 111 may be implemented by, for example, a micro-controller, and the $I^2C$ bus 112 includes a serial data line (SDA) and a serial clock line (SCL). The master module 111 is configured to communicate with the slave modules 12 via the SDA and SCL of the $I^2C$ bus 112. The flash memory 113 is configured to store program codes that configure, when executed by the master module 111, the master module 111 to implement a method for data communication with the salve modules 12. The non-volatile memory 114 is configured to store a communication error event.

The slave modules 12 are electrically connected to the $I^2C$ bus 112, and each of the slave modules 12 may be implemented by one of a thermal sensor, an electrically-erasable programmable read-only memory (EEPROM) and a power supply.

Figure 2:
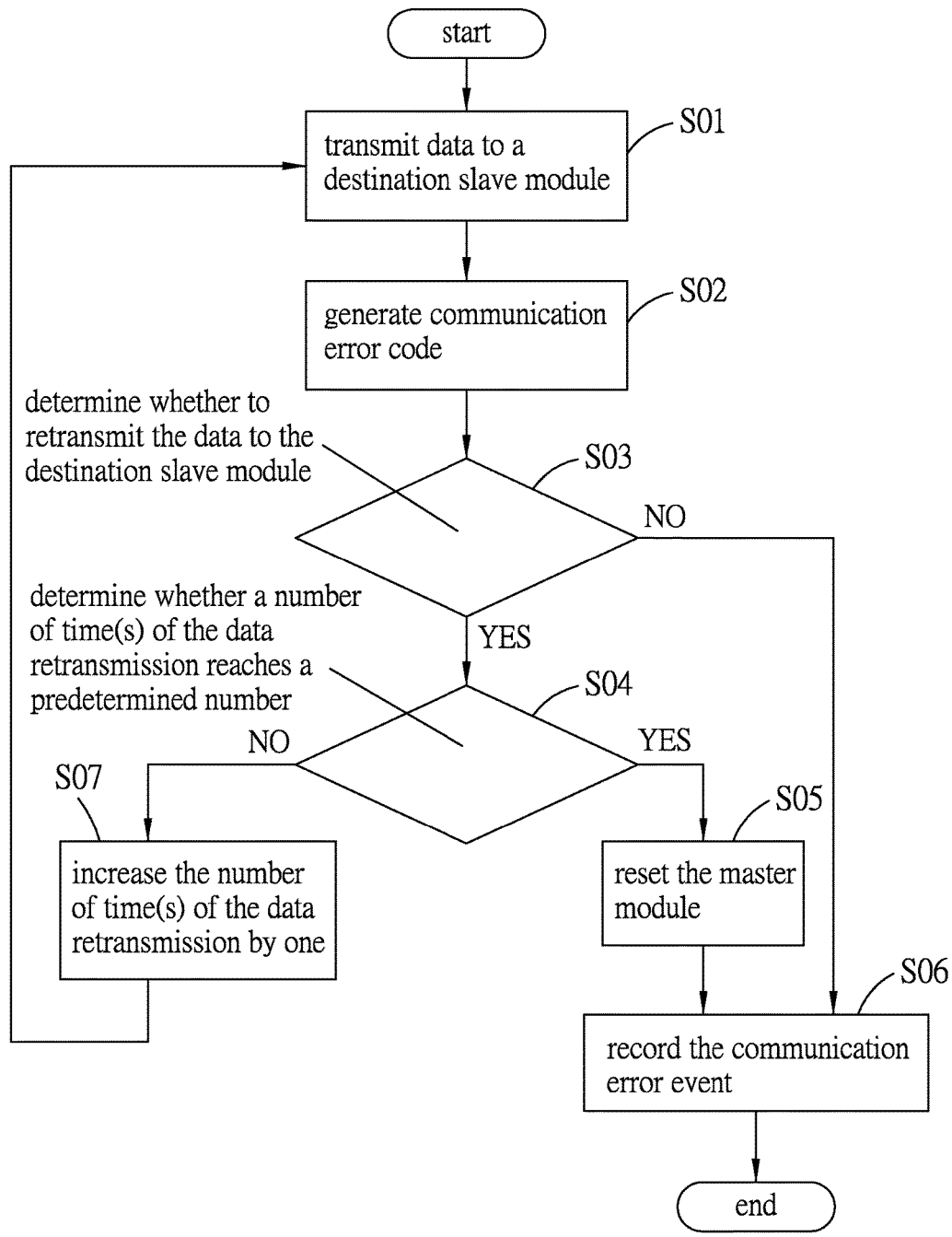
FIG. 2 is a flow chart of a method for data communication according to an embodiment of the disclosure.

Further referring to FIG. 2, the method for data communication implemented by the $I^2C$ system 1 according to an embodiment of this disclosure is illustrated hereinafter.

In step S01, the master module 111 transmits data to a destination one of the slave modules 12 via the $I^2C$ bus 112. Note that a predetermined number that indicates a number of time(s) of data retransmission associated with the data from the master module 111 to the destination one of the slave modules 12 is stored in the master module 111. In one embodiment, the predetermined number is stored in the flash memory 113. The program codes stored in the flash memory 113 configure, when executed by the master module 111, the master module 111 to retrieve the predetermined number and then store the predetermined number thus retrieved in a register in the master module 111.

In step S02, the master module 111 generates a communication error code indicative of error status when the data transmission from the master module 111 to the destination one of the slave modules 12 in step S01 fails. Specifically, the communication error code generated in step S02 indicates one of mutex timeout at the master module 111, unexpected interrupt source at the master module 111, data negative-acknowledgement (NACK) from the destination one of the slave modules 12, unrecoverable/recovered mutex timeout at the master module 111, and NACK of a slave address of the destination one of the slave modules 12.

In step S03, the master module 111 determines whether to retransmit the data to the destination one of the slave modules 12 according to the communication error code generated in step S02. Specifically, the master module 111 determines to retransmit the data to the destination one of the slave modules 12 when the communication error code indicates one of the mutex timeout of the master module 111, the unexpected interrupt source at the master module 111 and the NACK from the destination one of the slave modules 12. When the determination made by the master module 111 in step S03 is affirmative, the flow goes to step S04. In step S04, the master module 111 further determines whether a number of time(s) of data retransmission associated with the data from the master module 111 to the destination one of the slave modules 12 reaches the predetermined number. The flow goes to step S05 when the determination made in step S04 is affirmative, and goes to step S07 when otherwise.

In step S05, the master module 111 is reset. After being reset in step S05, the master module 111 records in the non-volatile memory 114 the communication error event according to the communication error code in step S06. The communication error event includes the communication error code, the number of data retransmission (s) (i.e., the number of time (s) of data retransmission) and history of the resetting of the master module 111. In one embodiment, before the communication error event is stored in the non-volatile memory 114, the communication error event is stored in a register in the master module 111.

In step S07, the master module 111 increases the number of time (s) of the data retransmission by one and the flow goes back to step S01 to repeat step S01.

On the other hand, when the determination made by the master module 111 in step S03 is negative, the flow goes directly to step S06 to record the communication error event in the non-volatile memory 114 according to the communication error code without resetting the master module 111. Specifically, the master module 111 determines not to retransmit the data to the destination one of the slave modules 12 when the communication error code indicates one of the unrecoverable/recovered mutex timeout at the master module 111 and the NACK of the slave address of the destination one of the slave modules 12.

In view of above, the I²C system 1 is configured to implement the method for data communication so as to determine whether the data retransmission associated with the data from the master module 111 to the designation one of the slave modules 12 is needed and whether the number of time (s) of the data retransmission reaches the predetermined number when the data transmission fails. Subsequently, the master module 11 is reset so as to proceed with the data retransmission to the designation one of the slave modules 12, increasing success probability of transmitting the data to the destination one of the slave modules 12 and enhancing communication quality of the I²C system 1. Furthermore, it is convenient for the user to retrieve the communication error event including the communication error code, the number of data retransmission(s) and the history of the resetting of the master module 111.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for data communication within an inter-integrated circuit (I²C) system that includes a master module, an I²C bus and a slave module, the method comprising the steps of:
   a) transmitting, by the master module, data to the slave module via the I²C bus;
   b) generating, by the master module, a communication error code indicative of error status when data transmission from the master module to the slave module in step a) fails;
   c) determining, by the master module, whether to retransmit the data to the slave module according to the communication error code generated in step b);
   d) when the determination made in step c) is affirmative, determining, by the master module, whether a number of time(s) of data retransmission associated with the data from the master module to the slave module reaches a predetermined number;
   e) when the determination made in step d) is affirmative, resetting the master module;
   f) after step b), recording, by the master module, a communication error event according to the communication error code; and
   wherein the communication error event includes the communication error code, the number of time(s) of the data retransmission and history of the resetting of the master module.

2. The method of claim 1, further comprising the step of:
   when the determination made in step d) is negative, increasing the number of time(s) of the data retransmission by one and repeating step a).

3. The method of claim 1, wherein when the determination made in step c) is negative, the communication error event is recorded according to the communication error code without resetting the master module.

4. The method of claim 1, wherein:
   the communication error code generated in step b) indicates one of mutex timeout at the master module, unexpected interrupt source at the master module, data negative-acknowledgement (NACK) from the slave module, unrecoverable/recovered mutex timeout at the master module, and NACK of a slave address of the slave module.

5. The method of claim 4, wherein in step c), the master module determines to retransmit the data to the slave module when the communication error code indicates one of the mutex timeout of the master module, the unexpected interrupt source at the master module and the NACK from the slave module.

6. The method of claim 4, wherein in step c), the master module determines not to retransmit the data to the slave module when the communication error code indicates one of the unrecoverable/recovered mutex timeout at the master module and the NACK of the slave address of the slave module.

7. The method of claim 6, wherein, when the master module determines not to retransmit the data to the slave module in step c), the communication error event is recorded according to the communication error code without resetting the master module.

8. The method of claim 1, wherein, when the determination made in step d) is affirmative, step f) is implemented to record the communication error event.

9. An expander device configured to be electrically connected to a slave module, said expander device comprising:
  an inter-integrated ($I^2C$) bus; and
  a master module configured to
    transmit data to the slave module via said $I^2C$ bus,
    generate a communication error code indicative of error status when data transmission from said master module to the slave module fails,
    determine whether to retransmit the data to the slave module according to the communication error code,
    record a communication error event according to the communication error code,
    when data transmission from said master module to the slave module fails, determine whether a number of time(s) of data retransmission associated with the data from said master module to the slave module reaches a predetermined number,
  wherein said master module is reset when the number of time(s) of the data retransmission reaches the predetermined number, and
  wherein the communication error event includes the communication error code, the number of time(s) of the data retransmission and history of the resetting of the master module.

10. The expander device as claimed in claim 9, further comprising a non-volatility memory configured to store the communication error event.

11. The expander device as claimed in claim 9, wherein said master module is further configured to increase the number of time(s) of the data retransmission by one and to retransmit the data to the slave module via said $I^2C$ bus when determining that the number of time(s) does not reach the predetermined number.

12. The expander device as claimed in claim 9, wherein said master module is configured to record the communication error event and not to be reset when determining not to retransmit the data to the slave module.

13. The expander device as claimed in claim 9, wherein the communication error code indicates one of mutex timeout at said master module, unexpected interrupt source at said master module, data negative-acknowledgement (NACK) from the slave module, unrecoverable/recovered mutex timeout at said master module, and NACK of a slave address of the slave module.

14. The expander device as claimed in claim 13, wherein said master module is configured to retransmit the data to the slave module when the communication error code indicates one of the mutex timeout of said master module, the unexpected interrupt source at said master module and the NACK from the slave module.

15. The expander device as claimed in claim 13, wherein said master module is configured to determine not to retransmit the data to the slave module when the communication error code indicates one of the unrecoverable/recovered mutex timeout at said master module and the NACK of the slave address of the slave module.

16. The expander device as claimed in claim 15, wherein when said master module is configured to determine not to retransmit the data to the slave module, said master module is configured to record the communication error code and not to be reset.

17. The expander device as claimed in claim 9, wherein said master module is configured to record the communication error event when determining that the number of time(s) of the data retransmission reaches the predetermined number.

* * * * *